Dec. 21, 1965 K. N. KAROL ETAL 3,224,270
FLOW GAUGES
Filed Feb. 12, 1963
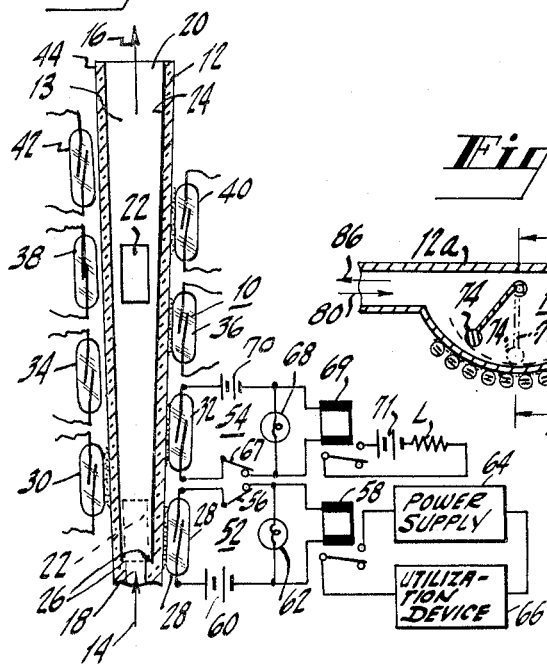
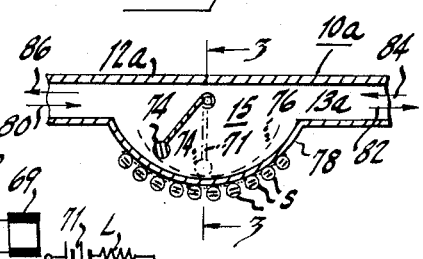
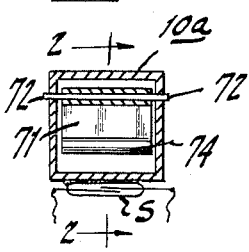
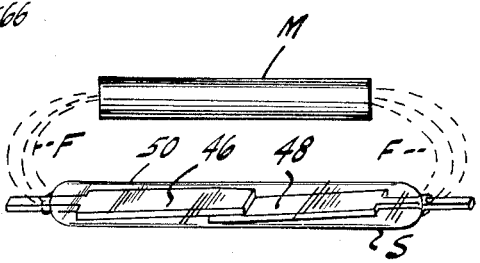
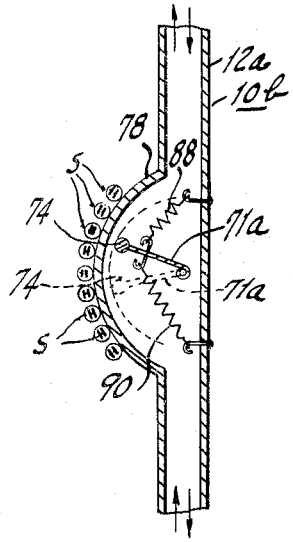
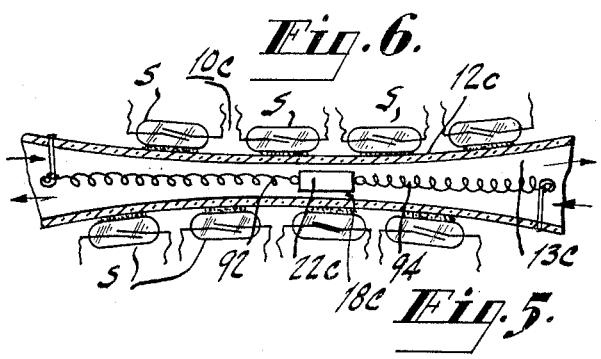
INVENTORS
KENNETH N. KAROL
IRVING WEISS
BY
ATTORNEY

United States Patent Office 3,224,270
Patented Dec. 21, 1965

3,224,270
FLOW GAUGES
Kenneth N. Karol, Teaneck, and Irving Weiss, Colonia, N.J., assignors to Radio Corporation of America, a corporation of Delaware
Filed Feb. 12, 1963, Ser. No. 257,939
6 Claims. (Cl. 73—209)

This invention relates generally to apparatus for monitoring the flow of a fluid, and more particularly to improved flow gauges of the type used to monitor, by magnetic and electric means, the rate of flow of a fluid in a conduit. The improved flow gauges of the present invention are particularly useful, for example, in monitoring the flow of a fluid in a manufacturing process and for controlling one or more steps in the manufacturing process in response to the rate of flow of the fluid.

In the process of manufacturing some types of electronic tubes, for instance, certain metallic parts of the tube must be heated to relatively high temperatures. The heating step is usually carried out in the atmosphere of an inert gas to prevent the oxidation of the metallic parts, and the rate of flow of the gas in the heating chamber is usually very low. As is known, the rate of flow of the gas may be measured by means of manometers and mechanical gauges, for example, but these indicators do not lend themselves easily for incorporation into electrical control circuits to control a manufacturing process in response to the low rate of flow of the gas. Most commercially available flow gauges that are adapted for use with monitoring circuits are designed for operation in relatively high pressure systems and depend upon relatively high rates of flow for their operation. Also, substantially all prior art flow gauges are designed to indicate the rate of flow of fluids flowing in only one direction. Some manufacturing processes utilize a fluid which may flow in either of two opposite directions, and a flow gauge that would indicate both the rate and the direction of flow of the fluid would be a desirable and useful addition to the art.

It is an object of the present invention to provide an improved flow gauge for monitoring the flow of a fluid by such magnetic and electric means as will introduce a virtually negligible amount of impedance to the flow of the fluid and will hence facilitate the indication of relatively low rates of flow.

Another object of the present invention is to provide an improved flow gauge for monitoring the rate of flow of a fluid by magnetically operated electrical switches that may be included in circuits for performing operations in response to desired rates of flow.

Still a further object of the present invention is to provide an improved flow gauge that is adapted to measure the rate of flow of a fluid in either of two opposite directions and to provide electrical intelligence in response to the direction and to the rate of flow, whereby to provide signals for monitoring and controlling a manufacturing process.

Still a further object of the present invention is to provide an improved flow gauge of the type described that is relatively simple yet reliable in construction, easy and inexpensive to install and to operate, and highly efficient in use.

Briefly, the improved flow gauge of the present invention comprises a conduit formed with a passageway that may be tapered and that is adapted to conduct the flow of a fluid, such as a liquid or gas, therethrough. A permanent magnet is disposed within the passageway of the conduit, and means are provided to retain the magnet in a rest position, or to restore it to a rest position, in the absence of any fluid flow. The magnet is adapted to move from its rest position in the direction of the flow of the fluid, the distance moved by the magnet being a function of the rate of flow of the fluid. At least one magnetically operated switch is disposed adjacent to the conduit so that it will be actuated by the magnet when the latter is within a predetermined distance from the switch. The actuated switch may be connected in an electrical circuit for energizing an indicating device, such as a lamp, which, in turn, indicates the flow of the fluid. The switch may also be in a circuit comprising components for performing a particular operation in response to the indicated fluid flow.

A plurality of switches may be disposed sequentially along the conduit for energizing a plurality of indicators, each indicator representing a different rate of fluid flow. A few embodiments of the invention are shown and described for monitoring the flow of a fluid, including flow in either of two opposite directions, and means for controlling a manufacturing process in response to one or more desired rates of flow of the fluid.

The novel features of the present invention, both as to its organization and method of operation, as well as additional objects and advantages thereof, will be more readily understood from the following description, when read in connection with the accompanying drawing, in which similar reference characters designate similar parts throughout, and in which:

FIG. 1 is a longitudinal, cross-sectional view of a flow gauge having switches that are connected in electrical circuits, in accordance with the present invention, for monitoring the flow of a fluid and for initiating one or more operations in a manufacturing process in response to different rates of flow of the fluid;

FIG. 2 is a longitudinal, cross-sectional view, taken along the line 2—2 in FIG. 3, of another embodiment of a flow gauge of the present invention adapted to indicate or control the rate of flow of a fluid in either of two opposite directions;

FIG. 3 is a cross-sectional view of the flow gauge taken along the line 3—3 in FIG. 2;

FIG. 4 is a longitudinal, cross-sectional view of still another embodiment of a flow gauge adapted to indicate or control the flow of a fluid in either of two opposite directions in accordance with the present invention;

FIG. 5 is a fragmentary sectional view of a further embodiment of a flow gauge adapted to indicate or control the rate of flow of a fluid in either of two opposite directions in accordance with the present invention; and FIG. 6 is an enlarged diagram of a magnetic reed switch and a bar magnet to illustrate the principles of operation of the magnetic reed switch.

Referring, now, particularly to FIG. 1 of the drawing, there is shown a flow gauge 10 for indicating the flow of a fluid therethrough. The fluid may comprise a liquid, a gas, or a vapor and the like. The flow gauge 10 comprises a tube or conduit 12 of non-magnetic material, such as a plastic material or copper, for example, and is formed with a passageway 13 that is tapered outwardly in the direction of flow of the fluid. The direction of fluid flow is indicated by the arrows 14 and 16. The fluid whose rate of flow is to be indicated enters the conduit 12 at the relatively narrower end portion 18 of the passageway 13 and leaves the conduit 12 at the relatively wider end portion 20 of the passageway 13.

A permanent magnet 22 is disposed within the passageway 13 and is adapted to be moved by the fluid when the latter is flowing through the conduit 12. The magnet 22 may comprise a solid bar of "Alnico," for example. Where a lightweight, movable member is desired, the magnet may comprise a rod of lightweight material, such as a plastic, with either a magnetic core or a magnetic outer shell. The magnet 22 is maintained in a rest position adjacent to the narrower end portion 18 of the passageway 13 in the absence of any fluid flow. The flow gauge 10 is adapted to be operated with its conduit 12 disposed transversely to the horizontal, and gravity tends to restore the magnet 22 to its rest position. The inner wall 24 of the conduit 12 is formed with a shoulder 26 for maintaining the magnet 22 in its rest position in the absence of any fluid flow. The rest position of the magnet 22 is shown in phantom (dashed lines) in FIG. 1.

In the presence of a fluid flow, the magnet 22 is moved in the direction of the outward taper of the conduit 12 to a position determined by a condition of equilibrium between the force of gravity and the force provided by the fluid flow. The distance that the magnet 22 travels along the passageway 13 from its rest position is a function of the rate of flow of the fluid.

Means are provided to monitor the rate of flow of a fluid through the flow gauge 10. To this end, a plurality of magnetically operated reed switches 28–42 are disposed sequentially along the outer wall 44 of the conduit 12, the switch 28 being adjacent the magnet 22 when the latter is in its rest position. The switches 28–42 may be secured to the wall 44 of the conduit 12 by any suitable means, such as, for example, mechanical straps or cement.

Referring, now, to FIG. 6, the construction and operation of a typical reed switch S, similar to the reed switches 28–42, will be explained. The reed switch S comprises a pair of resilient contact members 46 and 48 of magnetic material that has a relatively low magnetic reluctance. The contact members 46 and 48 overlap each other and are enclosed within a glass envelope 50 filled with an inert gas. In the absence of any magnetic forces, the contact members 46 and 48 are normally biased away from each other so that the switch S may be said to be normally open. A magnetic flux component of sufficient magnitude directed lengthwise of the contact members 46 and 48 causes mutual attraction thereof, and the contact members 46 and 48 engage each other, overcoming their inherent resilience and closing the switch S. Thus, a magnet M is preferably disposed substantially parallel to and adjacent to the switch S, and directs its lines of force F lengthwise of the contact members 46 and 48, causing their mutual attraction and closing the switch S.

Referring, now, to FIG. 1, the magnetically operated switches 28 and 32 are shown connected in circuits 52 and 54, respectively, for completing these circuits when the switches 28 and 32 are actuated by the magnet 22. The circuits 52 and 54 are merely illustrative of types of circuits for performing functions when energized and are not intended to be construed in a limiting sense, other circuits being within the contemplation of this invention.

In the cricuit 52, the switch 28 is connected in series with a normally closed switch 56, an indicator, such as a lamp 62, and a source of voltage 60. A relay 58 is connected in parallel with the lamp 62. The relay contacts are connected in series with a power supply 64 and a utilization device 66. The utilization device 66 may be a motor, for example, for performing an operation in a manufacturing process. It will now be observed that, with the switch 56 closed and with the magnet 22 in its rest position, that is, in the absence of any flow of a fluid through the flow gauge 10, the switch 28 will be closed, the utilization device 66 will be energized, and the lamp 62 will be lighted. Thus, the lighted lamp 62 indicates a zero rate of flow of fluid through the flow gauge 10. Conversely, the relay 58 and its contacts could be so connected to de-energize a utilization device if so desired when the rate of flow is zero. During certain phases of operation of the flow gauge 10, it may be desirable to inactivate the circuit 52. This can be done by opening the switch 56.

The switch 32 in the circuit 54 is connected in series with a switch 67, a lamp 68, and a source 70 of voltage. A relay 69 is connected in parallel with the lamp 68, and the switch of the relay 69 is connected in series with a source 71 of voltage and a load L. The load L may represent any utilization device, such as a heating element, for example, for providing heat in one of the steps of a manufacturing process employing the fluid whose flow is indicated by the flow gauge 10. It will now be understood that, if the rate of flow of the fluid through the gauge 10 were such that the magnet 22 would come to equilibrium adjacent to the switch 32 so as to close the switch 32, the lamp 68 would light and the load L would be energized to perform the function for which it was intended. When the lamp 68 lights, it indicates the rate of flow of the fluid through the gauge 10 is a predetermined amount. The absolute rate of flow represented by the lighted lamp 68 may be determined by a precalibration of the gauge 10, using a fluid under conditions with known rates of flow in a manner well known in the art.

The switches 30 and 34–44, as well as the other magnetically operated switches S illustrated and described herein, are not shown as being in circuits with indicating devices and/or utilization devices because these devices will vary with the particular process in which the gauge 10 is used. It will be understood, however, that the magnetically operated switches shown herein are adapted for use in circuits of the type illustrated by the circuits 52 and 54. In FIG. 1, the magnet 22 is shown adjacent to the switch 38 which, in turn, is actuated (closed) by the magnetic field produced by the magnet 22. The particular rate of flow determined by the closed switch 38 may be indicated by a lamp, similar to the lamp 62 or 68, for example, or by any other indicating means, such as a buzzer.

Referring, now, particularly to FIGS. 2 and 3, of the drawing, there is shown a flow gauge 10a adapted to be operated in a substantially horizontal position. The gauge 10a comprises a conduit 12a defining a passageway 13a. The conduit 12a has a substantially rectangular cross section and has an enlarged portion 15 formed by an arcuate section 78 of the lower wall of the conduit 12a. A rectangular gate 71 is pivotally mounted adjacent its upper edge within the enlarged portion 15 of the passageway by means of a pin 72. The ends of the pin 72 are supported in suitable openings in opposite walls of the conduit 12a. A permanent magnet 74 is fixed to the lower edge of the gate 71. The gate 71 is adapted to swing in the direction of a fluid flowing through the passageway 13a, the magnet 74 describing an arc indicated by the dashed line 76. In the absence of any fluid flow, the gate 71 assumes a vertical position due to the force of gravity, as illustrated by the gate 71 in phantom (dashed lines) in FIG. 2. The arcuate section 78 of the conduit 12a is tapered outwardly with respect to the arc 76 described by the magnet 74. The outward taper extends in opposite directions from the magnet's rest position.

The gauge 10a is adapted to indicate the flow of a fluid in either of two opposite directions. Thus, a fluid may enter the conduit 12a in the direction of the arrow 80 and leave in the direction of the arrow 82. Conversely, the fluid may enter in the conduit 12a in the direction of the arrow 84 and leave in the direction of the arrow 86.

A plurality of magnetically operated reed switches S are disposed sequentially along the arcuate section 78 of the conduit 12a. Each switch S is adapted to be actuated by the magnet 74 when the latter is adjacent to it. Thus, both the direction and the rate of flow of a fluid through the conduit 12a may be monitored at any instant by means of an indicator (not shown) electrically connected in circuit with the particular switch S that is actuated by the magnet 74. As stated above, the switches S in FIG. 2 are adapted to be connected in circuits of the type illustrated in FIG. 1.

In FIG. 4, there is shown a flow gauge 10b of the type shown in FIGS. 2 and 3, but modified to operate in substantially any position. To overcome the force of gravity on the gate 71a, the latter is resiliently connected to a wall of the conduit 12a by springs 88 and 90, the latter being fixed to opposite sides of the gate 71a and to the wall of the conduit 12a by any suitable means, such as hooks, and may be counterbalanced dynamically, if necessary, by any suitable means, as by counter weights (not shown). When the flow gauge 10b is disposed for operation, the springs 88 and 90 bias the gate 71a so that it assumes the position indicated in phantom by the dashed lines of the gate 71a in FIG. 4. It will now be understood that a fluid flowing through the conduit 12a causes the gate 71a to move in the direction of the fluid flow. Like the flow gauge 10a, the flow gauge 10b can indicate the direction and the rate of flow of a fluid in either of two opposite directions. The magnet 74 actuates the particular switch S to which it is adjacent, thereby indicating both the direction and the rate of flow of the fluid. As stated above, the switches S are intended to be in electrical circuits with suitable indicators for indicating the rate of flow of the fluid and also for operating a utilization device in a process having operations responsive to the rate of flow of the fluid. Since these circuits are substantially of the type illustrated by the circuits 52 and 54 in FIG. 1, they are omitted for the sake of clarity.

A flow gauge 10c is shown in FIG. 5 that represents a further modification of the flow gauge 10 shown in FIG. 1 to monitor both the direction of a fluid flow as well as its rate of flow. The gauge 10c comprises a conduit 12c whose passageway 13c is tapered outwardly in both directions from the narrowest portion 18c of the passageway 13c. A magnet 22c is disposed in the narrow portion 18c of the passageway 13c. The magnet 22c is disposed in its rest position by resilient springs 92 and 94, each being connected to opposite sides of the magnet 22a and anchored to the wall of the conduit 12c by any suitable means. The magnet 22c may be moved in either of two opposite directions by a fluid flowing in either of two opposite directions. A plurality of magnetically operated reed switches S are disposed sequentially along the conduit 12c so that each one may be actuated by the magnet 22c when the latter is substantially opposite to it. As stated above, each switch S, when actuated, is adapted to complete a circuit which may include an indicating device for indicating the rate of fluid flow and/or a utilization device for performing an operation in response to the indicated rate of fluid flow.

From the foregoing description, it will now be appreciated that there have been shown and described improved flow gauges of the type wherein the rate of flow of a fluid is monitored by magnetic and electrical means, thus obviating friction by eliminating mechanical indicating means. A few embodiments of the flow gauges of the present invention have also been shown and described for monitoring both the direction and the rate of flow of a fluid.

What is claimed is:

1. Apparatus for monitoring the flow of a fluid, said apparatus comprising
    (a) a conduit adapted to conduct the flow of said fluid therethrough,
    (b) a magnet having a pair of opposite poles,
    (c) means disposing said magnet at a rest position in the absence of said flow, said magnet being adapted to be moved from said rest position by said flow, and
    (d) a reed switch comprising a pair of substantially similar, substantially linearly aligned, normally open, resilient contacts of magnetic metal that has a relatively low magnetic reluctance, said switch being disposed adjacent to said conduit and adapted to be actuated by said magnet when said magnet is within a predetermined distance from said switch with said opposite poles of said magnet substantially parallel to said linearly aligned contacts, whereby a magnetic flux of sufficient magnitude can be directed lengthwise of said resilient contacts to cause mutual attraction thereof to close said switch.

2. Apparatus for monitoring the flow of a fluid as recited in claim 1, and comprising,
    said conduit being constructed of a nonmagnetic material,
    there being a plurality of said switches disposed adjacent to said conduit and sequentially along the direction of said flow,
    each of said switches being adapted to be actuated by said magnet when said magnet is within a predetermined distance therefrom, whereby the rate of flow of said fluid can be indicated.

3. Apparatus for monitoring the flow of a fluid as recited in claim 1, and comprising,
    said conduit being constructed of nonmagnetic material having a passageway tapered outwardly in the direction of said flow,
    there being a plurality of said switches disposed adjacent to said conduit and sequentially along the direction of said flow,
    each of said switches being adapted to be actuated by said magnet when said magnet is within a predetermined distance therefrom, whereby the rate of flow of said fluid can be indicated.

4. Apparatus for monitoring the flow of a fluid as recited in claim 1, and comprising,
    said conduit being constructed of nonmagnetic material and having a passageway tapered outwardly in opposite directions from said rest position of said magnet,
    there being a plurality of said switches disposed sequentially along and adjacent to said conduit,
    each of said switches being adapted to be actuated by said magnet when said magnet is within a predetermined distance therefrom, 5. Apparatus for monitoring the flow of a fluid as recited in claim 1, and comprising,
    a gate within said conduit,
    means pivotally attaching said gate adjacent one edge portion thereof to said conduit with said magnet being affixed adjacent to another edge portion of said gate,
    means cooperatively associated with said gate causing it to remain in said rest position in the absence of said fluid flow, said gate being adapted to swing in the direction of said flow when said flow is present,
    there being a plurality of said switches disposed adjacent to said conduit,
    each of said switches being adapted to be actuated by said magnet when said magnet is within a predetermined distance therefrom, whereby the rate of flow of said fluid can be indicated.

6. Apparatus for monitoring the flow of a fluid as recited in claim 1, and comprising,
    said conduit being constructed of nonmagnetic material and having a passageway a portion of which is arcuately shaped,
    a gate within said arcuately shaped portion of said passageway,
    means pivotally attaching said gate adjacent to one edge portion thereof to said conduit with said magnet being affixed adjacent to another edge portion of said gate, said gate being adapted to swing in the direction of said flow to cause said magnet affixed to said gate to move with said flow within said arcuate portion of said passageway,
    there being a plurality of said switches disposed adjacent to said conduit and sequentially along said arcuate portion in the direction of said flow, each of said switches being adapted to be actuated by said magnet when said magnet is within a predetermined distance therefrom, whereby the rate of flow of said fluid can be indicated.

References Cited by the Examiner

UNITED STATES PATENTS

| | | | |
|---|---|---|---|
| 2,339,922 | 1/1944 | Gatewood | 73—290.1 |
| 2,419,942 | 5/1947 | Brewer. | |
| 2,514,907 | 7/1950 | Stewart | 73—209 |
| 2,628,297 | 2/1953 | Grauer | 73—209 X |
| 2,724,969 | 11/1955 | Bloser | 73—228 |

FOREIGN PATENTS

| | | |
|---|---|---|
| 1,098,587 | 3/1955 | France. |
| 1,181,982 | 1/1959 | France. |
| 552,079 | 4/1955 | Italy. |

RICHARD C. QUEISSER, *Primary Examiner.*